Patented Mar. 2, 1937

2,072,402

UNITED STATES PATENT OFFICE 2,072,402

DIETETIC FOODSTUFF AND PROCESS FOR PREPARING SAME

Erich Kretschmer, Munich, Germany, assignor to Krause Medico Gesellschaft mit beschränkter Haftung, Munich, Germany No Drawing. Application November 19, 1932, Serial No. 643,527

5 Claims. (Cl. 99—104)

My invention relates to a dietetic food stuff produced from apples.

One of the principal ingredients for the medicinal effect of the product is pectin in the form as contained in raw, not fully ripened apples, namely protopectin. It is well known that the insoluble protopectin is converted into soluble pectin under the influence of ripening and storage. The same process is, for instance, the cause of the apples becoming pasty (M. H. Haller, Chem. Centralblatt 1930, I, 1236).

According to my invention this conversion is avoided by a drying process in which the product assumes only moderate temperatures, at the most about 40 to 50° C. Consequently, the product shows an extraordinarily great capability of swelling, and the acid contained in the raw immature apple maintains its concentration unaltered.

The manufacture of this product is based on peeled or unpeeled apples (preferably the latter) being first seeded, then converted into powder form, and the product then subjected to a final treatment for reducing its hygroscopicity. The procedure may follow different courses.

(a) Seeded, unripe apples are cut into slices or chips, or comminuted, for instance by cutting them in a meat-cutting machine. The coarsely comminuted material is then dried by a suitable drying process, for instance, upon belt-driers, hurdle-driers, in channel-driers or in vacuum drying chambers. The drying temperature for this process should not exceed 40 to 50° C. so as to alter the valuable ingredients only to such an extent as is desirable for therapeutical application.

The product thus dried to a water content of about 5 per cent is then ground, and for reducing its hygroscopicity subjected to a chemical after-treatment, for instance, granulated with an organic solvent such as stearine dissolved in ether, acetone or alcohol, and then dried again. As a result of this treatment the powder which immediately after being ground is finely pulverized becomes coarsely granular and acquires a certain hardness. This hardening process must, however, go only so far as not to affect the dissolving and swelling capability. The finished powder has still a content of moisture from 3 to 4 per cent. 100 grams of apple powder correspond to about 1 kilo of raw apples. The powder keeps in practice any length of time.

Attention is directed to the fact that the treatment with the organic solvent is not an extraction, in the ordinary sense of the word, for in ordinary extraction a liquid is used to dissolve certain ingredients from the substance being treated and this liquid with the dissolved substance is then removed, whereas in the present case the solvent alone is removed by evaporation so that anything that may have dissolved therein will again be left in the dried product, however, possibly in a different physical condition or in a different physical location with respect to the granules of the product. For example, the solvent treatment of a comminuted cellular substance such as the present one, which contains moisture, will produce the result that the alcohol or other solvent will extract the moisture, which alone when the alcohol is evaporated will not again return into the cell structures, but will pass off as vapor with the alcohol. Hygroscopic substances are found to be rendered inactive by the alcohol or other solvent used in the above process so that although the solvent is removed solely by evaporation and not by filtration or other bodily removal as a liquid, nevertheless, the result of the treatment is a hardening or agglomeration of the fine particles of the powder, thus producing a granular structure in place of the finely divided one and this physical change of dimensions of the particles presumably also plays a part in reducing the hygroscopicity of the product without necessarily producing any alteration in the chemical composition thereof.

While I do not confine myself to any definite theory or theories as to the precise modus operandi of the treatment with the solvent, I believe a plausible explanation may be that the solvent will extract from within the particles certain substances which are insoluble in water, and upon evaporation will deposit these substances upon the outer surfaces of the particles, thus producing a more or less water-proof coating on each particle which simultaneously will have the effect of cementing together groups of particles into granules of relatively larger sizes. The fact remains that the treatment with the solvent and the subsequent evaporation of the same do produce the granulation and hardening and decrease in hygroscopicity.

Instead of fresh apples, already partly dried apples may be used, for instance apple rings or apple chips which will again be dried as above described, ground, granulated, etc.

(b) Raw, immature, seeded apples are ground in a suitable comminuting device, for instance a beater mill, or an edge mill to a very fine homogeneous pulp, and this pulp is then dried by any suitable drying process, for instance, in a rotary drier or in an atomizing drier such as the Krause apparatus. In this case the product precipitates directly in pulverized form thus saving the grinding operation. The product is then only treated as described under (a) for reducing its hygroscopicity.

The finished product has an average composition about as follows:

| | Per Cent |
|---|---|
| Water (= moisture) | 4.1 |
| Water-insoluble portion | 9.9 |
| Water-soluble portion | 86.0 |
| Invert sugar | 55.8 |
| Cane sugar | 9.7 |
| Nitrogen compounds | 1.3 |
| Total acid (calculated as malic acid) | 2.6 |
| Mineral constituents | 2.3 |
| Pure pectin (calculated as calcium pectate) | 2.3 |
| Semi-cellulose and other swelling substances | 12.0 |

When using this preparation the apple powder is either distributed in boiled water at a temperature ready for drinking purposes, or with weak black tea or camomile tea, usually in a concentration from 4 to 6 per cent which however may be increased from 8 to 10 per cent. Milk, oatmeal gruel, or other foodstuffs may be added as well to the apple powder alone or after it has been made into a paste with water without spoiling the flavor, and there is valuable scope for application and dosage which is not possible either with raw apples or with apple preserves.

The application of this compound is manifold. It can serve for the therapy of all kinds of diarrhoeic diseases of children and adults. Owing to its considerable contents of nourishing ingredients (4 cal. per gram) it is at the same time a real medicinal foodstuff. It can be applied for instance for dietetic cures and as a morning drink.

The vitamins contained in the raw apple, i. e. especially the vitamin B and small amounts of vitamin C, are preserved in the dried product resulting from this process, and this represents a further and very essential medicinal factor for its application.

I claim:

1. A process for preparing a dietetical medicinal foodstuff which comprises powdering unripe apples, drying the powdered mass while maintaining it at a temperature not exceeding 50° C, treating the dried mass with a low boiling neutral organic solvent completely removable by volatilization, at reduced pressure, below 50° C. and drying again substantially without removing any substances contained in the unripe apples, except the water.

2. A process for preparing a dietetical medicinal foodstuff which comprises seeding and powdering unripe apples, drying the powdered mass while maintaining it at a temperature not materially exceeding 50° C., treating the dried mass with a low boiling, neutral organic solvent completely removable by volatilization, at reduced pressure, below 50° C. and drying again substantially without removing any substances contained in the unripe apples, except the water.

3. A process for preparing a dietetical medicinal foodstuff which comprises seeding and powdering unripe apples, drying the powdered mass in a vacuum while maintaining it at a temperature not exceeding 50° C., treating the dried mass with a low boiling, neutral organic solvent completely removable by volatilization, at reduced pressure, below 50° C. and drying again substantially without removing any substances contained in the unripe apples, except the water.

4. A process for preparing a dietetical medicinal foodstuff which comprises seeding and powdering unripe apples, drying the powdered mass while maintaining it at a temperature not exceeding 50° C., grinding the dried mass, treating the fine powder so obtained with a low boiling, neutral organic liquid completely removable by volatilization, at reduced pressure, below 50° C. and drying again substantially without removing any substances contained in the unripe apples except the water.

5. A process for preparing a dietetical medicinal foodstuff which comprises seeding and powdering unripe apples, drying the powdered mass by atomizing at a moderate temperature, treating the fine powder so obtained with a low boiling, neutral organic solvent completely removable by volatilization, at reduced pressure, below 50° C. and drying again substantially without removing any substances contained in the unripe apples, except the water.

ERICH KRETSCHMER.